US011513962B2

(12) United States Patent
Wang et al.

(10) Patent No.: US 11,513,962 B2
(45) Date of Patent: Nov. 29, 2022

(54) DRAINING OPERATION TO CAUSE STORE DATA TO BE WRITTEN TO PERSISTENT MEMORY

(71) Applicant: Arm Limited, Cambridge (GB)

(72) Inventors: Wei Wang, Cambridge (GB); Prakash S. Ramrakhyani, Austin, TX (US); Gustavo Federico Petri, Cambridge (GB)

(73) Assignee: Arm Limited, Cambridge (GB)

(*) Notice: Subject to any disclaimer, the term of this patent is extended or adjusted under 35 U.S.C. 154(b) by 107 days.

(21) Appl. No.: 17/069,057

(22) Filed: Oct. 13, 2020

(65) Prior Publication Data

US 2022/0114102 A1 Apr. 14, 2022

(51) Int. Cl.
*G06F 12/00* (2006.01)
*G06F 12/0875* (2016.01)
*G06F 12/0882* (2016.01)
*G06F 12/1009* (2016.01)
*G06F 13/16* (2006.01)
*G06F 11/30* (2006.01)
*G06F 9/30* (2018.01)
*G06F 9/38* (2018.01)
*G06F 11/14* (2006.01)
*G06F 11/20* (2006.01)

(52) U.S. Cl.
CPC ...... *G06F 12/0875* (2013.01); *G06F 9/30043* (2013.01); *G06F 9/30047* (2013.01); *G06F 9/3836* (2013.01); *G06F 11/1441* (2013.01); *G06F 11/2015* (2013.01); *G06F 11/3037* (2013.01); *G06F 12/0882* (2013.01); *G06F 12/1009* (2013.01); *G06F 13/1673* (2013.01)

(58) Field of Classification Search
CPC ........................ G06F 9/30043; G06F 13/1673
See application file for complete search history.

(56) References Cited

U.S. PATENT DOCUMENTS 9,946,492 B2 4/2018 Diestelhorst et al.
2015/0012713 A1* 1/2015 Flanders ............. G06F 12/0831
711/146

(Continued)

OTHER PUBLICATIONS

A. Raad et al., "Persistency Semantics of the Intel-x86 Architecture", Proc. ACM Program Lang., vol. 4, No. POPL, Article 11, publication date: Jan. 2020, 31 pages.

(Continued)

*Primary Examiner* — Daniel D Tsui
(74) *Attorney, Agent, or Firm* — Nixon & Vanderhye P.C.

(57) ABSTRACT

An apparatus comprises a write buffer to buffer store requests issued by the processing circuitry, prior to the store data being written to at least one cache. Draining circuitry detects a draining trigger event having potential to cause loss of state stored in the at least one cache. In response to the draining trigger event, the draining circuitry performs a draining operation to identify whether the write buffer buffers any committed store requests requiring persistence, and when the write buffer buffers at least one committed store request requiring persistence, to cause the store data associated with the at least one committed store request to be written to persistent memory. This helps to eliminate barrier instructions from software, simplifying persistent programming and improving performance.

16 Claims, 8 Drawing Sheets

(56) References Cited

U.S. PATENT DOCUMENTS

| | | | |
|---|---|---|---|
| 2018/0276124 A1* | 9/2018 | Chen | G06F 12/0638 |
| 2019/0227844 A1* | 7/2019 | Horii | G06F 9/30189 |
| 2020/0142829 A1 | 5/2020 | Wang et al. | |
| 2020/0379772 A1* | 12/2020 | Mukherjee | G06F 9/30043 |

OTHER PUBLICATIONS

S. Scargall, "Persistent Memory Architecture", Programming Persistent Memory, Chapter 2, 2020, pp. 11-30.
D. Narayanan et al., "Whole-System Persistence", ASPLOS ' 12, Mar. 3-7, 2012, 10 pages.

* cited by examiner

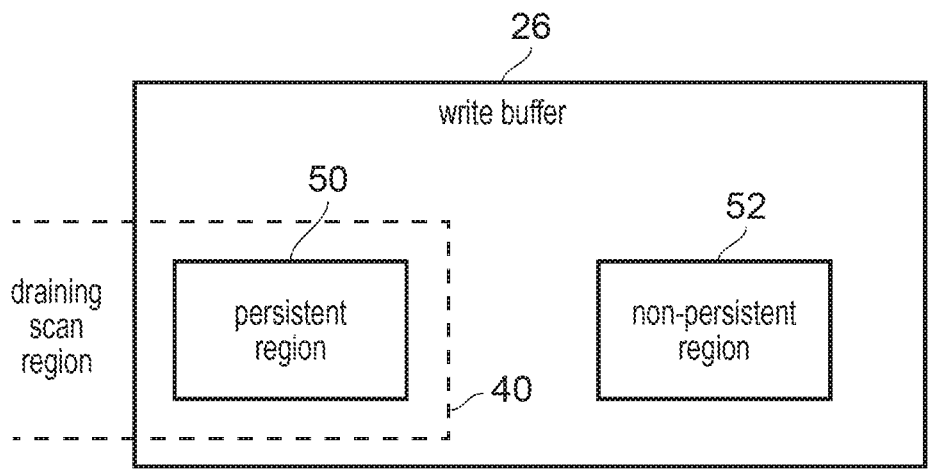
FIG. 6A
FIG. 6B
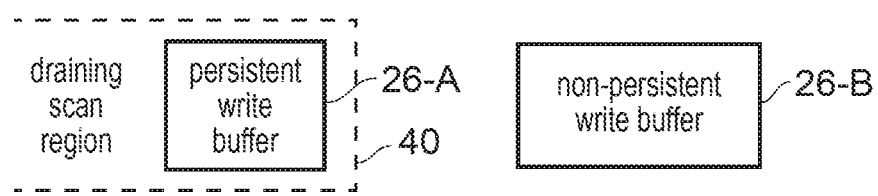
FIG. 7

DRAINING OPERATION TO CAUSE STORE DATA TO BE WRITTEN TO PERSISTENT MEMORY

BACKGROUND

Technical Field

The present technique relates to the field of data processing.

Technical Background

Processing circuitry may issue requests for accessing a memory system. The memory system may include at least one cache and at least one memory module. The issued requests may include store requests which request writing of store data to the memory system, and load requests which request reading of load data from the memory system.

SUMMARY

At least some examples provide an apparatus comprising: processing circuitry to issue store requests requesting writing of store data to a memory system comprising at least one cache and persistent memory; a write buffer to buffer the store requests issued by the processing circuitry, prior to the store data being written to the at least one cache; and draining circuitry to detect a draining trigger event having potential to cause loss of state stored in the at least one cache, and in response to detection of the draining trigger event, to perform a draining operation to identify whether the write buffer buffers any committed store requests requiring persistence, and when the write buffer buffers at least one committed store request requiring persistence, to cause the store data associated with the at least one committed store request requiring persistence to be written to the persistent memory.

At least some examples provide an apparatus comprising: means for processing, to issue store requests requesting writing of store data to a memory system comprising at least one cache and persistent memory; means for buffering the store requests issued by the means for processing, prior to the store data being written to the at least one cache; and means for draining, to detect a draining trigger event having potential to cause loss of state stored in the at least one cache, and in response to detection of the draining trigger event, to perform a draining operation to identify whether the means for buffering buffers any committed store requests requiring persistence, and when the means for buffering buffers at least one committed store request requiring persistence, to cause the store data associated with the at least one committed store request to be written to the persistent memory.

At least some examples provide a method comprising: issuing store requests issued by processing circuitry to request writing of store data to a memory system comprising at least one cache and persistent memory; buffering the issued store requests issued by the processing circuitry in a write buffer, prior to the store data being written to the at least one cache; detecting a draining trigger event having potential to cause loss of state stored in the at least one cache; and in response to detection of the draining trigger event, performing a draining operation to identify whether the write buffer buffers any committed store requests requiring persistence, and when the write buffer buffers at least one committed store request requiring persistence, to cause the store data associated with the at least one committed store request to be written to the persistent memory.

Further aspects, features and advantages of the present technique will be apparent from the following description of examples, which is to be read in conjunction with the accompanying drawings.

BRIEF DESCRIPTION OF THE DRAWINGS

FIGS. 6a and 6b show two examples of providing separate write buffer storage regions for persistent store requests and non-persistent store requests respectively;

FIG. 7 shows an example in which the write buffer includes a common storage region shared between persistent and non-persistent store requests;

DESCRIPTION OF EXAMPLES

Figure 1:
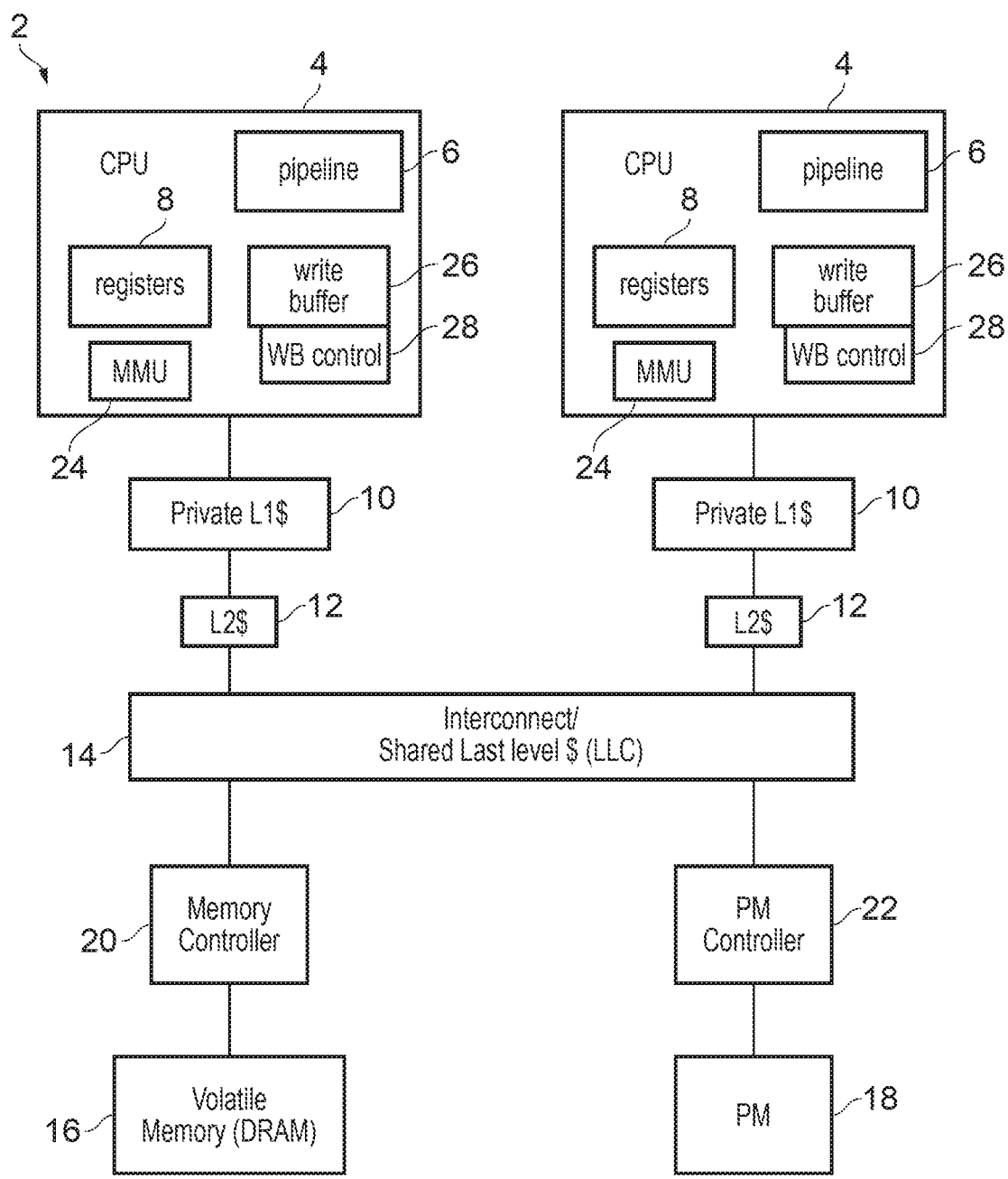
FIG. 1 schematically illustrates an example of a data processing system.

An apparatus has processing circuitry to issue store requests requesting writing of store data to a memory system comprising at least one cache and persistent memory. A write buffer buffers the store requests issued by the processing circuitry, prior to the store data being written to the at least one cache. The write buffer is used to buffer store requests between being issued by the processing circuitry and being written to at least one cache. It can be useful to buffer such stores in the write buffer, as if the cache cannot yet accept the store data, then the provision of the write buffer allows the pending store requests to leave the pipeline and make way for other operations to be processed by the processing pipeline (without the write buffer, the processing pipeline would become blocked if the cache is not ready to accept the store data). Also, the write buffer can help to support certain performance improvements, such as allowing multiple store requests to overlapping addresses to be merged into a single request to save cache bandwidth, or to allow store data for a pending store request to be forwarded for use as load data for a pending load request which is targeting addresses overlapping with the addresses of the store request, to save a cache access for that load request. These performance improvements are optional. Some processor designs may include more than one write buffer. In such a design, the references to "write buffer" below may refer to multiple write buffers collectively.

Increasingly, processing systems are using persistent memory (PM), where non-volatile memory is used to provide at least part of the random access memory used to store the working data of a process being executed in the processing circuitry. This contrasts with traditional systems where non-volatile memory storage would typically only be accessible using input/output (I/O) mechanisms, which are restricted to bulk transfers and are relatively slow. One benefit of providing PM is that this means that store data written to the PM during processing of a program may be retained even if the processing circuitry is reset or experiences a power down event (either a planned power down or an unplanned power down caused by unexpected loss of power), so that after resuming processing some of the data previously generated may be retained in the PM.

However, one problem that arises when PM is provided is that writebacks of data from caches to PM may take place out of order with respect to the order with which the corresponding store requests were defined in the program order of the program instructions executed by the processing circuitry. For example, data may be written back from caches as particular cache lines are evicted due to the cache storage capacity being needed for other addresses, and so the timing at which a particular item of data is written back to PM during regular program execution may depend on what addresses are accessed later, rather than the order in which the store requests were originally defined in the program. During regular program execution, it is generally not a problem if the PM temporarily gains a view of store data that is inconsistent with the program order of those stores (e.g. with the PM updated with store data for a younger store request before the store data for an older store request has been written to PM), because one would expect that eventually the store data for the younger store would be written back from the cache to PM. However, if a power down or reset event occurs when only part of the executed stores have had their data persisted to PM, then on resumption of processing after the power down or reset, the PM may include the store data for the younger store, but the store data for the earlier store may have been lost from the cache and so would not subsequently be written to the PM. This may not be a problem for all programs, but for some programs it can be important that there are guarantees provided concerning the order in which store data is persisted to PM.

One way to deal with this problem is to require that, if running on a system including PM, software which requires such guarantees of ordering should include additional instructions for flushing store data from caches to PM at certain points in the program, and barrier instructions for enforcing ordering between the store requests and the cache flushes. However, such additional instructions increase the overhead for software developers and compilers, and means that legacy code written for a system not having PM cannot simply be ported to a platform having PM without modification. This increases development costs.

Draining circuitry may be provided to detect a draining trigger event having potential to cause loss of state stored in the at least one cache. In response to detection of the draining trigger event, the draining circuitry performs a draining operation to cause some data to be written to the PM. In typical schemes implementing draining circuitry, the region of storage which may be scanned by the draining circuitry to identify which data needs to be persisted to PM may include a certain subset of the cache hierarchy. This may help to avoid the need to include the cache flush instructions mentioned above which are executed in software to cause data to be flushed from caches to PM, as the store data requiring persistence can now be saved to PM automatically when an event occurs which could cause that store data to be lost in the cache.

However, draining circuitry which only scans the caches for store data to be persisted may not be sufficient to eliminate the barrier instructions mentioned earlier, since many processor architectures may allow data to be written to caches in a different order from the program order associated with those store requests. This means that without appropriate barrier instructions store data for a later store request in program order could become visible in the caches earlier than store data for an older store request. Hence, when such a draining operation is performed based on scanning the caches for data requiring persistence, there could be some store data for an older store request pending in a write buffer of the processing circuitry while store data for a younger store request in program order is already within the caches, so that there would still be a risk of the PM gaining an incorrect view of the results of the program if the barrier instructions were removed.

In the examples discussed below, the draining circuitry performs a draining operation which identifies store data associated with a committed store request pending in the write buffer of the processing circuitry, and causes that store data to be written to PM. Hence, a draining scan region of storage, which is scanned by the draining circuitry when a draining trigger event occurs to identify whether there is any data that should be persisted to PM, includes the write buffer.

Hence, the draining circuitry may detect a draining trigger event having potential to cause loss of state stored in the at least one cache. In response to detection of the draining trigger event, a draining operation is performed to identify whether the write buffer buffers any committed store requests requiring persistence. When the write buffer buffers at least one committed store request requiring persistence, the draining circuitry causes the store data associated with the at least one committed store request requiring persistence to be written to PM.

This exploits the inventors' observation that, even in processors which support out-of-order execution of instructions, stores become committed in the write buffer in program order. This means that the order of commitment seen by the write buffer may be in program order even if no barrier instructions have been included in software to enforce an order with which stores are persisted to PM. Hence, by including the write buffer in a storage region checked by the draining circuitry to identify store data to be written to PM in response to a draining trigger event, this avoids the need for software to include the barrier instructions mentioned earlier, to reduce the effort required for developing software to execute on a system which has PM. This greatly simplifies persistent programming. Also, removing the barriers improves performance since it avoids unnecessarily holding back certain memory accesses which could be handled more efficiently if reordered with respect to other memory accesses.

The processing circuitry could be in-order processing circuitry which is restricted to executing instructions in program order, or could be out-of-order processing circuitry which is able to execute instructions in a different order from program order. In the out-of-order example, the commitment of store requests written to the write buffer may be handled in different ways. Some examples may only write store requests to the write buffer once they have been committed. However, other examples could allow store requests to be written to the write buffer before they have been committed and may specify in a given entry of the write buffer whether the corresponding request is committed or not. Non-committed store requests, if present within the write buffer, may not be drained to PM by the draining circuitry when the draining trigger event occurs. Hence, by including the write buffer in the draining scan region and preventing any non-committed store requests in the write buffer having their store data drained to PM, this ensures that the PM does not gain visibility of store data any younger store request beyond the youngest committed store request, and that the store data of any older store requests than that youngest committed store request are visible to the PM, even if there are no barrier instructions in the program code. This may be the case even if write back of data from write buffer to caches is allowed to be out of order with respect to program execution. Writebacks from the write buffer to the cache may be out of order regardless of whether the processing circuitry is in-order or out-of-order (even in in-order processors the order in which store requests are written back from the write buffer to the cache may be out of order). Hence, while the processing circuitry may commit store requests buffered to the write buffer in program order, writeback of store data from the write buffer to the at least one cache for a given number of store requests is permitted to be performed in a different order from a program order associated with a store request. It is this out of order write back that has previously required the barriers to be included, but by including the write buffer in the draining scan region targeted by the draining circuitry these barriers are not necessary.

In some implementations all store requests could be regarded as persistent requests whose store data should be preserved to PM if necessary. However, in practice the memory system may include some volatile memory storage as well as PM. Hence, it may be desirable in some cases not to have store data associated with addresses mapped to volatile storage being persisted to PM in the draining operation. Hence, in some implementations store requests may be classified into persistent store requests which require persistence and non-persistent store requests which do not require persistence. If the write buffer buffers any committed non-persistent store requests then the store data for those non-persistent requests may be prevented from being written to the PM by the draining circuitry during the draining operation.

There may be different ways in which the write buffer can be organised to allow the draining circuitry to identify which requests are persistent store requests and non-persistent store requests. In one example the write buffer may include a first storage region to buffer persistent store requests requiring persistence and a second storage region to buffer non-persistent store requests not requiring persistence. For example the first and second storage regions could be respective subsets of entries within a common storage structure provided for the write buffer, or could be two separate storage structures (e.g. separate write buffers, which may collectively be regarded as the write buffer described earlier). Regardless of the particular way in which the first and second storage regions are implemented, in a draining operation the draining circuitry may scan the first storage region of the write buffer to identify whether the first storage region buffers at least one committed store request to be written to PM, but may omit scanning of the second storage region.

In another option the write buffer may have a shared storage region which has entries which could be allocated to either persistent store requests or non-persistent store requests. In this case, each entry of that common region of the write buffer may comprise the persistence indicator specifying whether a corresponding store request is persistent or non-persistent. In this case in the draining operation, the draining circuitry may scan the write buffer to identify at least one entry which represents a committed store request for which the persistence indicator specifies that the corresponding store request is a persistent store request, and cause the store data associated with the at least one entry marked as representing a persistent store request to be written to PM.

As mentioned further below, another option could combine these approaches and designate a particular region of write buffer storage as being reserved for non-persistent store requests (to cut down the amount of write buffer entries that need to be scanned by the draining circuitry when the draining trigger event occurs, as the region reserved for non-persistent store requests does not need to be scanned). A shared region of the write buffer storage could then be used either for persistent store requests or non-persistent store requests, with a persistence indicator included in each entry of the shared region of the write buffer, to indicate whether a store request buffered in that entry is a persistent store request or a non-persistent store request.

A store request received for buffering in the write buffer may specify a persistence identifier identifying whether the store request is a persistent store request or a non-persistent store request. The processing circuitry may set this persistence identifier in various ways. In one example, page table data associated with a target address of a given store request may be used to identify whether the given store request should be treated as a persistent store request or a non-persistent store request. For example the page table entries of address regions mapped to the PM could include some information which specifies that any store requests targeting addresses in that region should be treated as a persistent store request, while other page table entries mapped to storage other than PM could be marked to identify that store requests targeting those address regions should be treated as non-persistent store requests.

Another option may be that capability information associated with the target address of the given store request may be used to identify whether the given store request is a persistent store request or a non-persistent store request. Some processor architectures may support capability-based addressing, where instead of merely referencing an address pointer, load/store instructions reference a "capability" which provides an address pointer but also provides associated information for controlling how the address pointer is allowed to be used. For example, the capability may define an allowable range for the address pointer, so that attempts to use the address pointer to access memory locations outside an allowable range can be detected. Hence, in a capability-based architecture, the additional information provided by the capability for a given target address may include an indication of whether the store request targeting that capability should be treated as a persistent store request or a non-persistent store request.

Another approach for distinguishing persistent and non-persistent store requests may be that different program instructions may be defined in the instruction set architecture to provide "persistent" store instructions and "non-persistent" store instructions respectively. Hence, with this approach the processing circuitry may determine whether a given store request is persistent or non-persistent based on an encoding of the instruction which caused the given store request to be issued by the processing circuitry.

Some implementations may only use one or other of these alternatives (page table data, capability information or instruction encoding) to define whether a store request is persistent or non-persistent). It is also possible to use these options in combination with any two or more of the page table data, capability information and instruction encoding together identifying whether a given store request is persistent (e.g. dedicated persistent store instructions could always have their store requests treated as persistent, but other general store instructions which are not the dedicated persistent store instruction may be either persistent or non-persistent depending on the page table information or capability information accessed for that store operation).

The write buffer may not be the only storage structure for which stored data is drained to PM by the draining circuitry. In response to the draining trigger event, the draining circuitry may also ensure that stored data associated with a committed store request requiring persistence, which is no longer buffered in the write buffer due to being written to at least one cache, and which has not yet been written back to PM, is written to the PM as part of the draining operation. Hence, store data written to the cache(s) may also be protected against loss on a reset or power down event by providing the draining circuitry to identify that store data and save it to PM.

There are different ways in which the draining circuitry can ensure that store data for a committed store request which has been written back from the write buffer to the cache is persisted in the draining operation. One approach could simply be that, in the draining operation performed in response to the draining trigger event, the draining circuitry scans at least a portion of the at least one cache to identify store data to be written to the PM. Hence, the draining scan region would include both the write buffer and the at least one cache.

However, caches may be relatively large structures, and may store a lot of data not requiring persistence and so including the caches in the draining scan region may greatly increase the time required to perform the draining operation (as there may be many more entries to be scanned to check whether they relate to store requests requiring persistence). This may mean that any back up power source used to support the draining operation may need to be provided with a greater maximum capacity which can increase the expense of implementation.

Another approach can be that a persist buffer may be provided. Persist buffer write control circuitry may control, when store data is written back from the write buffer to the at least one cache for a store request requiring persistence, the store data to be written to the persist buffer as well as to the at least one cache. By providing a separate structure to which store data requiring persistence is written in parallel with the caches, this means that when the draining operation occurs, it is not necessary to scan the caches themselves to identify the data to be persisted to PM, and instead it is enough simply to scan the persist buffer which may be a much smaller structure and so therefore allows the time taken for the draining operation to be reduced. This avoids the need to over-margin the maximum charge provided in a backup power supply used to support the draining operation.

Hence, in response to detection of the draining trigger event in an implementation using such a persist buffer, the draining scan region may include the write buffer and the persist buffer, but the at least one cache may be excluded from the storage region scanned by the draining circuitry in the draining operation when identifying store data to be written to PM in response to the draining trigger event. When the draining operation is being performed, then when the persist buffer stores store data which has not yet been written back to PM, the draining circuitry may cause that store data stored in the persist buffer to be written to the PM.

In some examples the processing circuitry may have architectural support for identifying certain sections of program execution as a failure atomic section whose effects on memory should be observed atomically by the PM. For example the instruction set architecture may allow certain sections of code to be identified as being a failure atomic section, for example by bounding the section of code by a failure atomic start instruction and a failure atomic end instruction to mark the start and end points of the failure atomic section.

In response to the draining trigger event, the draining circuitry may prevent store data associated with a given store request requiring persistence from being written to PM when the draining circuitry determines that the given store request was issued in response to an instruction executed within the failure atomic section of program execution when an end point of the failure atomic section has not yet been reached by the processing circuitry. Hence, with this approach the software developer or the compiler is able to mark that certain sections should either be persisted in their entirety or should not be persisted, to avoid cases when only part of the store data generated by a partially processed failure atomic section is persisted when other parts are not persisted. This can help to ensure failure atomicity which can be a desirable feature for some software applications.

In some implementations, write buffer control circuitry associated with the write buffer may prevent writing of store data from the write buffer to the at least one cache when the store data is identified as relating to a store request issued in response to an instruction executed within a failure atomic section for which the end point has not yet been reached by the processing circuitry. As writes in the write buffer may be drained to caches out-of-order, if store data for an uncompleted failure uncompleted section was allowed to be written to the caches, ensuring atomicity of the operations within a failure atomic section could require storage of additional metadata to track whether particular cache lines relate to uncompleted failure atomic sections, and additional control circuit logic to control, based on that metadata, whether cache lines can be written back to PM or made visible to other cores. In contrast, by preventing writing of store data for an uncompleted failure atomic section to the at least one cache until after the failure atomic section has reached its end point, this simplifies management of failure atomicity as it is not necessary to include circuit logic associated with the caches for managing failure atomicity. Store data associated with an uncompleted failure atomic section can be retained within the write buffer until after the failure atomic section reaches its endpoint, and the draining circuitry may prevent data associated with an uncompleted failure atomic section from being written to PM in response to a draining trigger event.

For example, to implement such atomicity, at least a portion of the write buffer may comprise write buffer entries specifying a failure atomic section identifier for identifying an associated failure atomic section. In response to an indication from the processing circuitry that a given failure atomic section associated with a given failure atomic section identifier has reached the end point, the write buffer may update write buffer entries in the at least a portion of the write buffer for which the failure atomic section identifier corresponds to the given failure atomic section identifier, to indicate that store data associated with the updated write buffer is allowed to be written to PM in the draining operation.

In some implementations, the failure atomic section identifier could be an identifier comprising two or more bits, so that the apparatus supports multiple different failure atomic sections to be pending at a time, and the processing circuitry and write buffer (and persist buffer if provided) can identify which store requests relate to a particular failure atomic section.

However, in other implementations, the failure atomic section identifier could be a single bit, so that only a single failure atomic section is supported at a time by the hardware. This may still be sufficient to provide the failure atomicity desired by software. If software includes multiple nested failure atomic sections then these can simply be "merged" and treated as one larger failure atomic section by the hardware.

The draining trigger event may be any event which has the potential to cause loss of state stored in at least one further level cache of the cache hierarchy. For example the draining trigger event could be a reset event, which may occur when a reset input to the processing system is asserted. For example the system may be reset when a power-off or restart button is pressed by the user. The reset input may also be asserted in response to some types of interrupt or exception which indicate that a non-recoverable error has occurred. In response to the reset event, storage elements such as flip-flops of the processing circuit may be reset to some default state (either binary zero or binary one depending on the particular storage element). This may cause loss of state when storage elements within a cache are reset. Therefore, when a reset event occurs, it can be useful to perform the draining operation to scan the write buffer (and either the cache hierarchy or the persist buffer, depending on which option is implemented) for store data associated with committed store requests requiring persistence, which can be saved to PM before resetting the corresponding storage elements which stored the store data.

Another example of a draining trigger event may be a power down event, when a drop in power is detected on a main power supply used to supply the processing circuitry with power. The power-down event could be an event when power is suddenly interrupted which may cause volatile storage circuits to lose their state. The power down event could also be a planned power-down event to save energy, such as entry into a sleep or hibernate mode, for example by power gating caches and cores to save energy. Regardless of whether the power down event is planned or unplanned, the power down event risks loss of data in any caches. By performing the draining operation in response to the draining trigger event this preserves the store data in the write buffers or caches/persist buffer that is associated with committed store requests, so that after resuming after the power down the PM will include a consistent view of store data which includes all updates up to the youngest store request in program order that was already committed at the point when the power down event occurred.

The draining circuitry and at least a portion of the write buffer may be coupled to a backup power supply input for supplying backup power during the draining operation. The backup power supply input may be separate from a main power supply input for supplying power to the processing circuitry. The main power supply input may also supply power to the write buffer during normal operation, but during the draining operation if the main power supply is not available then the write buffer can be supplied with power from the backup power supply input instead, so that there is sufficient energy to allow any store data to be persisted to be read from the write buffer and written back to PM. Hence, by providing a backup power supply input, this can provide energy for performing the draining operation even when a power down event has occurred interrupting the main power supply. The backup supply input may be a pin on the integrated circuit comprising the processing circuitry and draining circuitry, through which power is supplied from a backup power source such as a battery or capacitor. The battery or capacitor itself may not be part of the integrated circuit implementing the apparatus defined in the claims, as a battery or capacitor may be coupled to the backup supply input in a downstream step of the manufacturing/supply chain, so may not be present at the point when an apparatus comprising the processing circuitry, write buffer, cache(s), draining circuitry and backup supply input is manufactured or supplied to a customer.

The backup power supply is not essential for supporting the draining circuitry described above, as even without a backup power supply it would still be possible to perform the draining operation when a reset event occurs as the draining trigger event as discussed above. However, providing a backup power supply input can be useful to allow the system to also perform the draining operation in response to a power down event. For example the backup power supply can be a battery or supercapacitor which may supply a certain amount of power for a period long enough to support the operations for scanning the write buffer (and either the cache(s) or the persist buffer) and saving the identified store data requiring persistence to the PM in the draining operation. The particular charge capacity needed for the battery or supercapacitor may depend on the size of the data structures to be scanned and the expected latency of the scanning/writeback operations, so may vary from implementation to implementation.

When a backup power supply is used then it can be particularly useful to exclude the caches from the scanned subset of the cache hierarchy, as this may allow more affordable batteries or capacitors to be used as the backup supply instead of needing relatively expensive uninterruptable power supplies (UPS) which are typically provided as backup power for large-scale servers. Hence, designing the apparatus to exclude the caches from the scanned subset of the hierarchy, by including the persist buffer to which store data for persistent store requests is written in parallel with the cache, can help to reduce the overall cost of implementing the backup power supply.

The write buffer may have associated write buffer control circuitry for controlling allocation of store requests to the write buffer and handling of store requests pending in the write buffer. Optionally, in some implementations, the write buffer control circuitry may support certain features to help with improving performance, such as store merging or store-to-load forwarding. If store merging is supported, the write buffer control circuitry may control merging of two or more store requests buffered in the write buffer targeting overlapping addresses, to form a merged store request which can then be issued to the cache as a single request. For example the write buffer control circuitry may check addresses of incoming stores against addresses of stores already buffered in the write buffer to check whether there is any overlap, and when there is an overlap between addresses of two or more successive store requests then merging these stores into a single request can reduce the bandwidth required for accessing the cache. If store-to-load forwarding is supported, the write buffer control circuitry may forward store data from a given store request to a given load request, where the given store request and the given load request target overlapping addresses. Hence, addresses of stores may be compared with addresses of loads, and when a load requires some of the store data from a pending store in the write buffer then that store data can be forwarded to the load to avoid the load needing to read that data from the cache, again saving cache bandwidth and hence improving performance by allowing the available cache access bandwidth to be used for other requests. Some systems may support both store merging and store-to-load forwarding, and other implementations may not support any of these features, or only support one of these features.

The persistent memory may comprise any form of memory for which the contents of the memory may remain available after a power cycle or other reboot. For example, 'persistent memory' may include non-volatile memory such as core memory, flash memory, magneto-resistive random access memory (MRAM), ferroelectric RAM (F-RAM), phase-change RAM (PCRAM), resistive RAM (ReRAM), correlated-electron RAM (CeRAM) and other memory technologies that are inherently non-volatile. In addition, 'persistent memory' may include main memory that is automatically backed-up up to non-volatile memory (such as flash memory) and reloaded following a power cycle. For example, non-volatile, dual inline memory module (NVDIMM-N) combines a DIMM, DRAM, flash storage and small power supply in the same module.

The PM may be byte-addressable memory. That is, the PM may support access to individual bytes of data rather than only supporting access to larger blocks of data. For example, for a range of memory addresses mapped to the PM, each distinct binary value of a memory address that can be generated by the processing circuitry within that range may correspond to a distinct byte of data within PM (note that, even if the processing circuitry requests access to only a single byte within the PM, it is possible that some hardware implementations may nevertheless return a larger block of data from the PM and cache that larger block, in anticipation that it is possible the processing circuitry could later require other portions of that block). In contrast, most non-volatile storage accessible through input/output ports may be block-addressable, supporting access only at a coarser granularity than PM (e.g. access in blocks of 512 bytes, to give one example). Traditionally, non-volatile storage has been used only for bulk storage of data or program code for offline storage, rather than storing working data being updated regularly during the processing of program code. In contrast, with the development of PM technologies such as MRAM or PCRAM for example, it is becoming feasible to provide byte-addressable PM which opens up the opportunity to use the PM to store regular working data within the main random access memory of the processor, but this introduces the issues associated with persistence ordering discussed above, which can be addressed by extending the draining scan region to include the write buffer as described earlier.

The PM may comprise at least one off-chip PM module, and/or at least one on-chip PM module acting as one or more buffers. For example, the buffers may include on-chip caches, scratchpad memories, or buffers within a memory controller or interconnect, or snoop filters, for example.

FIG. 1 schematically illustrates an example of a data processing apparatus 2 having a number of processor cores 4, which in this example are central processing units (CPUs), but could also include other forms of processing elements such as graphics processing units (GPUs) for example. Each processor core has a processing pipeline 6 for fetching, decoding and executing instructions to carry out data processing operations. Registers 8 are provided for storing operands for use by the instructions and for storing the results of executed instructions. Some of the instructions executed by the pipeline 6 are load/store instructions which request access to a memory system which comprises a number of levels of caches and main memory. In this example the caches include a private level 1 cache 10 and level 2 cache 12 which are private to an individual processor core 4. An interconnect 14 also comprises a shared level 3 cache (also known as the last level cache or LLC). The interconnect 14 manages coherency between the private caches 10, 12 of the respective cores 4. The last level cache could also act as a snoop filter which may at least partially track occupancy of some of the private caches to help with managing coherency. Any known coherency protocol could be used for managing coherency. The caches cache a subset of data from underlying main memory, which in this example includes at least one volatile memory module 16 (for example dynamic random access memory (DRAM)), and at least one module of persistent memory (PM), which is a form of non-volatile storage which is byte-addressable and could be implemented either as on-chip or off-chip memory. The volatile and PM 16, 18 have respective memory controllers 20, 22 for controlling access to the respective memory modules.

Each processor core 4 has a memory management unit (MMU) 24 for controlling access to the memory system by the CPU 4. The MMU 24 performs address translation of virtual addresses to physical addresses. The MMU 24 may also check access permissions controlling whether access to a particular address is allowed. The address translation mappings and permissions are defined in page table data read from the memory system. Information derived from page table data may be cached locally by the MMU 24 in a translation lookaside buffer.

When the processing pipeline executes a store instruction, the pipeline issues a store request to request that store data is written to the memory system. Such store requests are buffered in a write buffer 26 before they are sent to the level one cache 10. Write buffer control circuitry 28 controls the allocation of store requests into the write buffer and the issuing of store requests to the level 1 cache 10. While store requests are pending in the write buffer 26, the addresses of those store requests may be compared with addresses of other store requests and if there are multiple store requests issued for the same address or for overlapping addresses, these may be merged into a smaller number of requests to save cache access bandwidth. Also, it is possible for store data associated with a store request pending in the write buffer 26 to be forwarded to a load request which is requesting reading of data from the memory system, when the load requests access to addresses which overlap with addresses targeted by the store request. By forwarding data from a store to a load, this avoids the need for the load to issue a read request to the caches 10, 12, 14 if it can obtain its load data from the store data of a pending store. By supporting such store merging or store-to-load forwarding, the write buffer 26 can help to improve performance. Even if such store merging or store-to-load forwarding is not supported, the provision of the write buffer can be useful for performance because it allows store instructions to pass from the pipeline 6 to the write buffer 26 even if their store data is not yet ready to store to the cache, so that later instructions can be processed by the pipeline 6 using the unblocked pipeline stages. Similarly the write buffer enables store requests to be held back if the cache currently is not yet ready to accept the store request.

The processing pipeline 6 of a given processor core 4 may be an in-order pipeline restricted to executing program instructions in program order, or could be an out-of-order pipeline which is capable of executing instructions in a different order from the program order. Regardless of whether the pipeline is in order or out of order, commitment of store requests in the write buffer 26 may be performed in program order. However, passing of store requests from the write buffer 26 to the level 1 cache 10 may be performed out of order with respect to the program order. Hence, even in an in-order processor, it is possible that store data for a younger instruction in program order may be written to the cache before store data associated with an older instruction in program order, in the absence of any barriers used to enforce certain ordering requirements on instructions.

Figure 2:
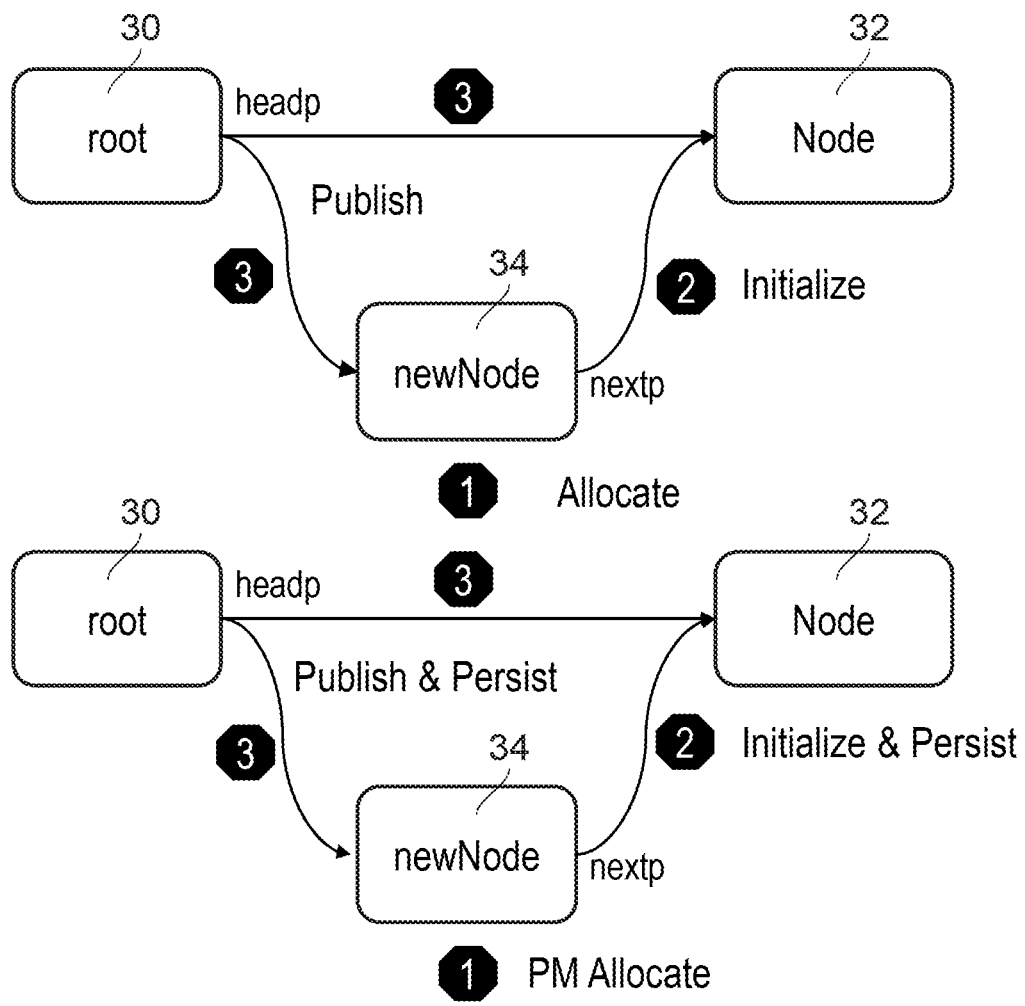
FIG. 2 shows an example software task of allocating a new node to a linked list, which is an example of a scenario where barrier instructions would previously be needed to ensure correct ordering of storing store data to persistent memory.

FIG. 2 shows a simple example of a programming scenario which may cause added complexity when the code is executed on a system having PM 18. The top part of FIG. 2 shows an example of the programming in a system not having PM 18, and the bottom part shows how the programming may need to be adapted for PM 18 if the draining circuitry mentioned later was not provided (the draining circuitry helps to avoid this added programming complexity).

The example of FIG. 2 concerns adding a new node to a linked list. As shown in the top part of FIG. 2, the linked list may initially comprise a root node 30 whose pointer "headp" may initially be pointing to a subsequent node 32 in the linked list. The user may wish to add a new node 34 in the linked list between the root node 30 and the subsequent node 32, so that the head pointer of the root node 30 should be modified to point to the new node 34 and the next pointer "nextp" of the new node 34 points to the subsequent node 32. Some code which may be suitable for performing this action in a system not having PM could be as follows:

```
1   //Add a node to a linked list
2   void
3   addnode{struct root *rootp, int data)
4   {
5       struct node *newnodep;
6       if ((newnodep = calloc(1, sizeof(struct node))) == NULL)
7           fatal("out of memory");
8       newnodep->data = data;
9       newnodep->nextp = rootp->headp;
10      rootp->headp = newnodep;
11  }
```

Hence, the addition of the new node into the link list comprises a number of steps including:

Step 1: memory is allocated for the new node 34 and the data for the new node is written to the newly allocated area of memory (lines 5-8 of the code snippet shown above).

Step 2: the new node is initialised, by setting the pointer of the new node to point to the subsequent node 32 in the linked list (line 9 of the code snippet).

Step 3: the new node is published by updating the head pointer of the root node 30 to point to the new node 34 instead of the subsequent node 32 (line 10 of the code snippet).

Here, the operations at lines 8-10 of the code snippet all correspond to store operations to write data to memory. In this example, it is important that the new node is allocated and initialised (steps 1 and 2) before it is published (step 3). If the store data written at step 3 (line 10) was visible before the new node has been allocated and initialised (lines 8 and 9), then subsequent accesses to the linked list may see junk data in the region of memory pointed to by the head pointer of the root node 30 after the publishing step.

In a system not having PM 18, this may not be a problem because once the store requests have been executed, although writebacks from the write buffer 26 to the caches 10, 12, 14 and from the caches 10, 12, 14 to memory 16 may be out of order with respect to program order, there is only a relatively short period of time when store data for a younger store request is visible in a cache 10, 12, 14 or memory 16 when store data for an older store request is not yet visible (eventually all the store data will get pushed through to the caches 10, 12, 14 and memory 16), and if there was any power failure or reset all the data in the caches 10, 12, 14 and volatile memory 16 would be lost. On resumption from the power down event or the reset the relevant data for the linked list can be recreated by re-executing any associated code if necessary.

However, in a system having PM 18, data written to the PM during processing of a program is persisted, so that it is still visible even after a power cycle or a reset. Therefore, extra care would need to be taken when processing code such as the example above where the order in which data is persisted to PM 18 may be important. If the code example shown above was executed on the system having PM 18 without modification, there would be a risk that even though the stores appear in the program in a particular order, once the store data has been written into the caches 10, 12, 14, the writing back of data from the caches to the PM 18 may take place in an arbitrary order which may differ from the program order so that at a given point in time it might be possible that the updated head pointer for the root node 30 (store data for store at line 10) has been persisted through to PM 18 but the data for the new node 34 or the pointer of the new node 34 (store data for stores at lines 8 or 9) are still in the caches 10, 12, 14 and have not yet been written back to PM 18. The caches may be implemented using a volatile form of storage technology and so there is a risk that if a power down or reset occurs, after resuming from that event the PM 18 may include the updated pointer for the root node 30 but may not include any of the initialised data and pointer for the new node yet, and so the PM 18 has gained an inconsistent view of the outcome of the previously processed code which may be problematic when processing then resumes.

The lower part of FIG. 2 shows what additional actions may be performed in software to guard against this problem, as represented by the following expanded code example:

```
1   //Add a node to a linked list
2   void
3   addnode{struct root *rootp, int data)
4   {
5       struct node *newnodep;
6       if ((newnodep = pm_calloc(1, sizeof(struct node))) == NULL)
7           fatal("out of memory");
```

-continued

```
8     newnodep->data = data;
9     newnodep->nextp = rootp->headp;
10    pm_flush(newnodep, sizeof(struct node));
11    pm_fence() ;
12    rootp->headp = newnodep;
13    pm_flush(&(rootp->headp), sizeof(rootp->headp));
14    pm_fence() ;
15  }
```

Again, the new node 34 is to be allocated, initialise and published in the same way as described earlier (lines 5-9 and 12), except that this time the new node 34 is allocated to a region of PM 18 instead of volatile memory 16. However, this time at step 2 as well as initialising the new node by setting its pointer to point to the subsequent node 32, additional instructions are required to ensure that the allocated data and initialised pointer for the new node are persisted to PM before the publishing step 3 is performed. These are shown at lines 10 and 11 of the code described above. These additional instructions include a PM flush instruction at line 10 which is an instruction for causing the processor core 4 to request that data for a specified address is flushed from the caches to PM 18. Also at line 11 a barrier instruction (PM fence) is included which enforces ordering between the various store instructions triggered by the instructions at lines 8, 9 and 12 so that the store request at line 12 cannot be performed until the earlier store requests at lines 8, 9 and the flush request at line 10 have been performed. Once the flush and barrier instructions at lines 10-11 have been processed then it is possible to publish the new node in the link list by updating the root node's pointer at line 12. However then subsequently a further flush instruction and barrier would then be needed to make sure that the new value of the pointer from the root node 30 to the new node 34 is persisted.

These extra instructions at lines 10-11 and 13-14 of the code add extra overhead for software developers when developing code for a system using PM. They mean that it is not possible simply for legacy code written for a system not using PM to be ported onto a system with PM without modification.

Figure 3:
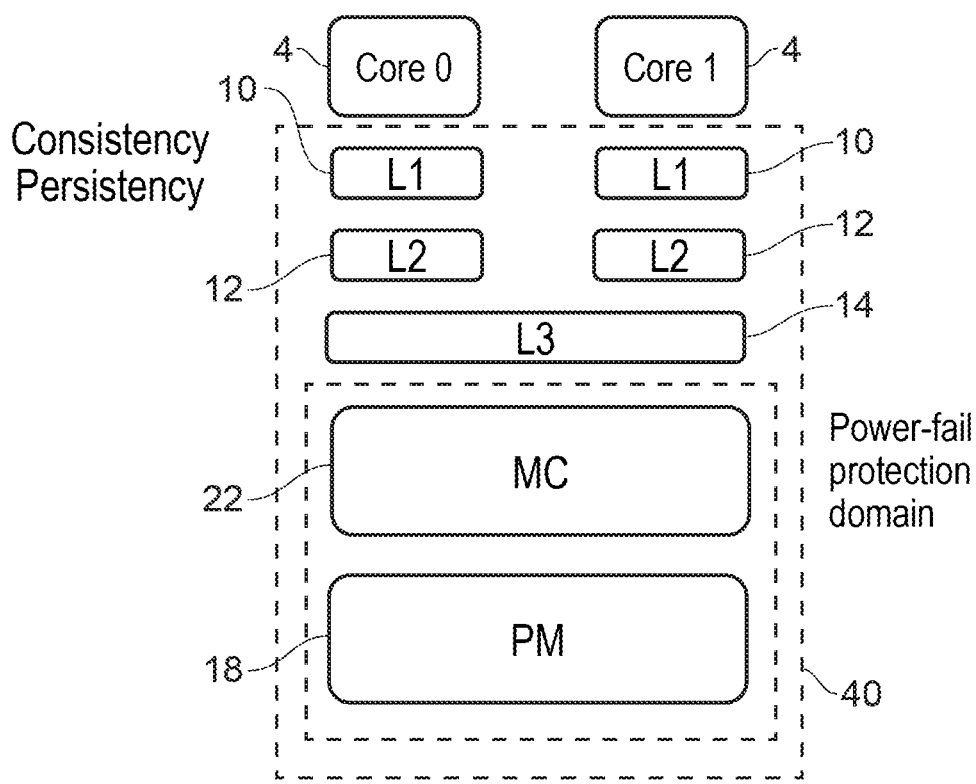
FIG. 3 shows for comparison an example in which a draining scan region, within which data requiring persistence is guaranteed to be saved to persistent memory when a draining trigger event occurs, includes multiple levels of cache.

FIG. 3 shows a technique which can partly help to eliminate the cache flush instructions. A power fail protection domain (or draining scan region) may be defined to include the various levels of caches 10, 12, 14 in the cache hierarchy, any request queues within the PM memory controller 22, and the PM 18 itself. Any data associated with addresses mapped to the PM 18 that is stored within the draining scan region 40 may be guaranteed to be preserved even if there is a reset event or power down. Clearly, for the data in the PM 18 itself this may be due to the persistent nature of that memory storage, but for the caches 10, 12, 14 and memory controller 22 if implemented using volatile storage, the data stored in those structures 10, 12, 14, 22 may be guaranteed to be persisted, by providing draining circuitry powered by a backup supply which may, in the event of detecting an event which could cause loss of data in the caches (such as reset of power down), scan the caches 10, 12, 14 and memory controller buffers 22 for data that requires persistence, and cause that data to be written back to the PM 18. For example a battery or capacitor may be provided as the backup power supply for such a draining operation. Therefore, since any data requiring persistence that is stored within the caches 10, 12, 14 and memory controller buffers can be guaranteed to be preserved by hardware in the event of a power down or reset, there would be no need for the software to include the cache flush instructions shown at lines 10 and 13 are the example shown above.

However the barrier instructions shown at lines 11 and 14 would still be required even in the example of FIG. 3. This is because some processor architectures may use a weak memory model where it is allowed for a younger store operation in program order to bypass an older store operation for a different address so that the younger store is executed first. In many cases this may not be a problem, but the linked list update example shown above is one example where it would be problematic if the store request for the publishing step 3 bypassed the store requests for the new node allocation and initialisation steps 1 and 2, and so the barrier instruction shown at line 11 of the code example above is still needed. Similarly, in the example of FIG. 3, the barrier instruction at line 14 may be needed to ensure that the new pointer from the publishing step is pushed through from the write buffer 26 to the caches to ensure that they enter the draining scan region 40 (otherwise it may be possible that at the point of a reset/power down the store data for the store request at line 12 is still in the write buffer 26 and so may not be preserved). Therefore, provision of the draining scan region comprising only the cache hierarchy 10, 12, 14 and the PM memory controller 22 is not enough to eliminate these barriers, and so there is still some extra effort needed by developers to patch legacy software in order to run on systems with PM 18.

One solution could be that compilers or programming languages have to specify stricter memory models to prohibit certain write after write reorderings, but in practice this may effectively require memory barriers to still be issued (although inserted by the compiler rather than the software programmer), so this still represents extra overheads for persistent programming as software written for a legacy system not having PM 18 may still need to be recompiled. Such barrier instructions can also incur significant performance overheads. Similarly, while some microarchitectural designs may implement stricter memory models in hardware, a code developer developing code for generic execution over a range of microarchitectural platforms may not wish to rely on this, as they may include the barriers anyway to ensure the code can function on micro-architectural hardware implementations not implementing the stricter memory models. Hence, it would be desirable if possible to be able to remove the barriers altogether, without relying on particular implementations of tighter memory models concerning the extent to which store ordering can be changed. In any case implementing such stricter memory models may have an impact on performance as other sets of stores which could have been reordered to improve performance may then be prohibited from being reordered unnecessarily.

Figure 4:
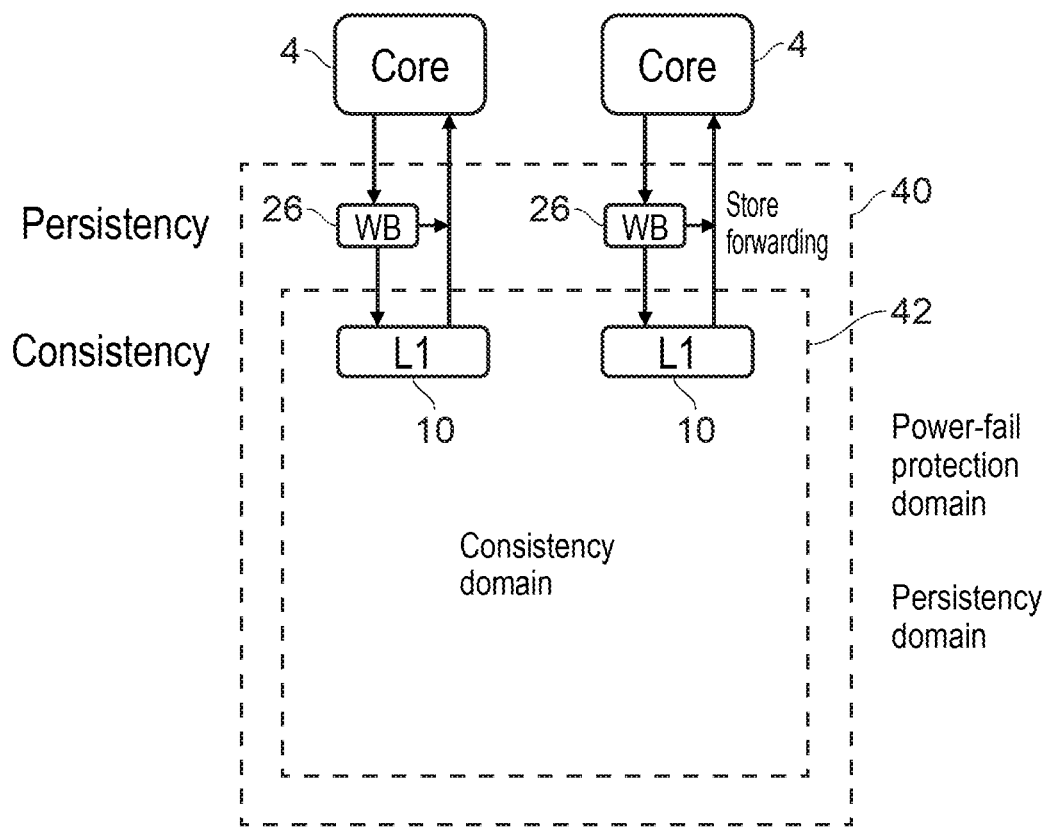
FIG. 4 illustrates an example in which the draining scan region is extended to include the write buffers of processor cores.

FIG. 4 shows a technique which can be used to address this problem which does not require the memory model to be tightened or the software to include the barriers. As shown in FIG. 4 the draining scan region 40 (which represents the region of storage for which data requiring persistence can be guaranteed to be preserved by the hardware in the event of a power down or reset) is extended to include not only the cache hierarchy 10, 12, 14 and PM memory controller 22 as shown in FIG. 3, but also includes write buffers 26 of the processor core 4 (the L2 and L3 caches 12, 14 and PM controller 22 are not shown in FIG. 4 for conciseness).

This exploits the observation that even if the processor core 4 is an out-of-order processor, store requests are generally committed into the store buffer 26 in-order. Therefore, at any given time instant, the set of store requests that are indicated as committed in the write buffer cannot include a committed younger store request if any previous older store requests have not themselves been committed. Therefore, by including the write buffer 26 within the draining scan region 40, so that store data of a committed store request which requires persistence (e.g. a store request whose address is mapped onto the PM 18) is guaranteed to be written back to PM if the power fails or if a reset event occurs, this means that even if the write backs from the write buffer 26 to the level 1 cache 10 are out of order with respect to program order, this does not affect the persistence of the corresponding store data to PM 18 and so the problem of the inconsistent view of a program outcome seen by the PM 18 discussed above does not arise.

This approach can be seen as counter-intuitive because the extension of the draining scan region 40 to include the write buffer 26 means that the window of persistency (the set of data which is guaranteed to be persisted to PM 18 even if there is a reset or power down) may now be larger than the window of consistency 42, which is the region for which updates made by one processor core 4 become visible to another processor core. In the example of FIG. 3 the consistency and persistency windows would have been the same since store data becomes visible to another core 4 once the requesting core 4 writes the data to the level 1 cache 10 (so the data then has its coherency managed based on the coherency protocol administered by the interconnect 14), and in the example of FIG. 3 writing to the level 1 cache 10 is also the point at which the data enters the draining scan region 40.

In contrast in the approach shown in FIG. 4, data within the write buffers 26 is within the draining scan region 40, but not subject to coherency management by the interconnect 14, so is within the persistency window but not in the consistency window. Therefore, the window of "persistency" runs ahead of the window of "consistency". Although it may seem odd to have the PM being guaranteed to gain visibility of data which is not yet visible to other cores, the inventors recognised that surprisingly this is not a problem. In fact, running persistency ahead of consistency is advantageous, because it means that even in the presence of a weak memory model the stores whose store data is guaranteed to be persisted are those defined up to a certain point of program order, despite being made visible to other cores out of order, and so this allows sequential programs to execute correctly even without the barrier instructions discussed above. This greatly simplifies the development of software for systems having PM.

Figure 5:
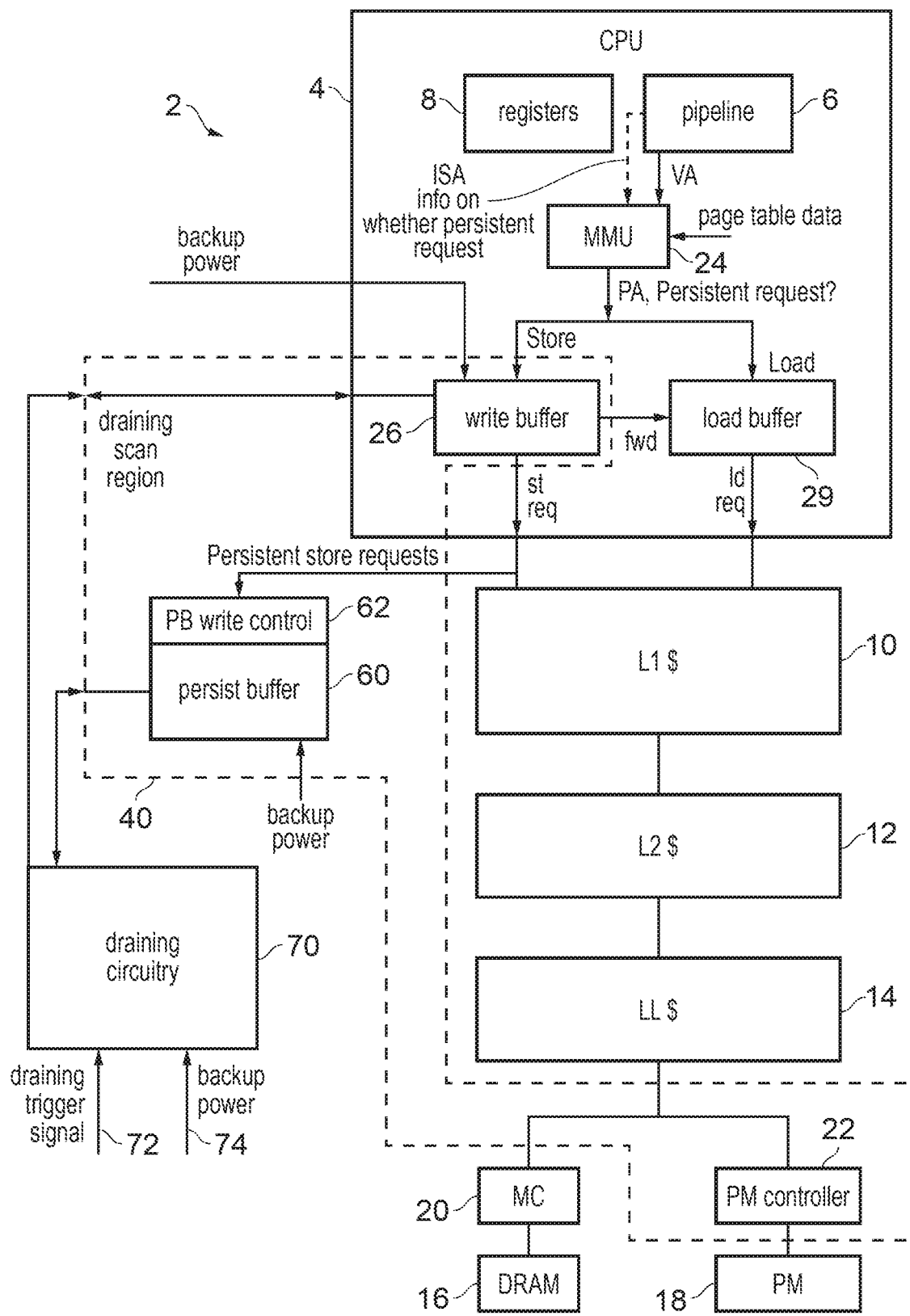
FIG. 5 illustrates an example where the draining scan region includes the write buffer and a persist buffer.

FIG. 5 shows a first example for implementing the extended draining scan region 40 explained above. The elements in FIG. 5 which are the same as in FIG. 1 are shown with the same reference numerals. Again the CPU 4 includes a pipeline 6, registers 8, an MMU 24 and the write buffer 26. In addition, this example shows that the processor core 4 also includes a load buffer 29 which is used to buffer load request to be sent from the processor core 4 to the caches (although the load buffer 29 was not shown in FIG. 1, it would also be provided there). The write buffer control circuitry 28 described earlier is not shown in FIG. 5 for conciseness but is still provided. It will be appreciated that the processor core 4 may have many other elements not shown in the diagram. Also for conciseness FIG. 5 only shows a single processor core 4 but other processor cores may also be provided.

In this example, the processor core 4 has a mechanism for determining whether certain store requests are to be considered as persistent store requests or non-persistent store requests. This helps to reduce the overhead of the draining operation to drain information from the draining scan region 40 to PM 18, as it means that any non-persistent requests do not need their store data to be persisted in the draining operation. Different mechanisms may be used to identify which requests are persistent or non-persistent. One option is that the MMU may identify based on the page table data used to translate the target address of a store request whether that store request should be treated as a store request or a non-persistent request. For example the page table entries associated with regions of memory mapped to the PM 18 may include a flag to indicate that any store requests targeting that region of the address space should be considered persistent request and then the MMU 24 may use that information to provide an indicator to the write buffer 26 along with a given store request to indicate whether that request is persistent or not.

If the processor core 4 supports capability-based addressing (where capability instructions reference a "capability" which provides an address pointer and associated information (such as permitted address bounds) for restricting valid use of the address pointer), then for a capability-based store request the additional information in the capability associated with the target address could include information specifying whether the store request is a persistent store request or a non-persistent store request.

Another option is that certain instructions may be defined as persistent store instructions which are dedicated to generating persistent store request, in contrast to other non-persistent store instructions which may cause non-persistent store requests to be issued. Hence, the processor pipeline 6 may decode instructions, and based on the instruction encoding of the instruction decoded to cause the store request to be issued, may provide information to the MMU 24 and/or the write buffer 26 to indicate whether a given store request should be regarded as persistent or not.

Regardless of exactly how it is identified whether a particular request is to be persistent or non-persistent, the write buffer 26 may buffer store requests in a way which allows the persistent store requests to be distinguished from the non-persistent store requests. FIGS. 6A, 6B and 7 show different examples of how this could be distinguished. In the examples of FIGS. 6A and 6B distinct regions of storage are designated for persistent and non-persistent store requests respectively. For example, as shown in FIG. 6A a single write buffer structure may be partitioned into first and second regions 50, 52 designated for storing persistent and non-persistent requests respectively (e.g. the first/second regions could be different cache ways or different subsets of cache sets within a set-associative or fully-associative cache structure used for the write buffer 26). Alternatively, as shown in FIG. 6B entirely separate write buffers 26-A and 26-B (with completely separate addressing schemes for identifying a particular hardware entry of the buffer) may be designated as the persistent and non-persistent regions for storing persistent and non-persistent store requests respectively. In either case, as shown in FIGS. 6A and 6B the draining scan region 40 may include only the persistent region 50, 26-A and need not include the non-persistent region 52, 26-B. Alternatively as shown in FIG. 7, persistent and non-persistent store requests could both be allocated to a common (shared) region of the write buffer 26, but each buffer entry 54 may include a persistence indicator 56 which distinguishes whether the corresponding request is a persistent or non-persistent request. Other information that could be indicated in each buffer entry could include a valid indicator 58 indicating whether the corresponding entry provides a valid store request, an address tag 60 which identifies that store address to which the store data 62 is to be written, the store data 62 itself, and an indication 64 of whether or not the store request has been committed yet. In some implementations if store requests are only written to the write buffer 26 once committed then the committed indicator 64 may not be necessary.

Other examples implementing the write buffer 26 could combine the approach shown in FIG. 7 with that of FIG. 6A or 6B, in that it may be possible for the persistent region 50, 26-A to have a buffer structure such as that shown in FIG. 7 which includes the persistent indicator 56 so that it is possible to allocate non-persistent requests into the persistent region 50, 26-A. This may improve utilisation of the buffer since if there are not enough persistent store requests to fill the persistent region 50, 26-A then some of that storage capacity could be used for non-persistent requests. Nevertheless by excluding persistent requests from being allocated into the non-persistent region 52, 26-B, this cuts down the number of entries which would need to be scanned in the draining scan region 40 as discussed further below. It is noted that the labels "persistent" and "non-persistent" used to refer to the regions 50, 52, 26-A, 26-B in FIGS. 6A and 6B refer to the types of request expected to be allocated to those regions and do not refer to the type of memory storage technology used to implement the hardware storage for those regions. Both the persistent and non-persistent regions of the write buffer 26 may be implemented using volatile storage technology which would lose its state if power was removed. Hence the term "persistent" in the labels for regions 50, 26-A does not imply that the hardware storage is implemented using a non-volatile or persistent memory storage technology.

Returning to the discussion of FIG. 5, the store requests in the write buffer 26 can therefore be identified to be either persistent store requests requesting storage of write data which requires persistency, or non-persistent store requests whose store data does not require to be persisted to PM 18.

In the example of FIG. 5, a separate storage structure 60 is provided in parallel with the level one cache 10, called a persist buffer 60 which has associated persist buffer write control circuitry 62. The persist buffer 60 is used to store the store data associated with persistent store requests issued from the write buffer 26, in parallel with the store data for those store requests being written to the level one cache 10. Hence, while for non-persistent store requests issued from the write buffer 26, the corresponding store data would be written to the level one cache 10 but not the persist buffer 60, when a persistent store request is issued from the write buffer 26 then the persist buffer write control circuitry 62 controls the corresponding store data to be written to the persist buffer 60, as well as the corresponding write to the cache 10. It may seem redundant to write the same data to two locations. However, the level one cache 10 may be a relatively large structure which may contain many items of data associated with non-persistent store requests which would not need to be persisted to PM 18 when a power down or reset event occurs, and so if the draining scan region 40 was to include the caches 10, 12, 14 then this draining operation to scan those caches to identify the persistent data would take some time. While store data for persistent requests still needs to be written to the cache structure 10, 12, 14 to allow it to be visible to other cores 4, by also writing the store data to a persist buffer 60 which is a smaller structure dedicated to storing the store data for persistent store requests, this means that when a draining trigger event occurs such as a reset or the power down event, draining circuitry 70 only needs to scan the smaller persist buffer 60 and the write buffer 26 to identify store data for committed store requests which needs to be persisted PM 18, which may reduce the time taken to perform the draining operation. In one implementation, the caches 10, 12, 14 may not be allowed to evict dirty lines to persistent memory 18—instead only entries from the persist buffer 60 may be allowed to be written back to PM 18. A variant could be to have a shared persist buffer alongside the LLC 14 as well that accepts evictions from private persistent buffers alongside each L1D$ 10 associated with respective cores 4, before sending such requests to a write pending queue at the PM controller.

Hence, the draining circuitry 70 is provided which provides hardware logic for automatically scanning contents of the storage structures 26, 60, 22 within the draining scan region 40 when a draining trigger signal 72 indicates that a draining trigger event occurs. The draining trigger event may be a reset event or a power down event (either a planned power down or an unexpected power down caused by power failure). The draining circuitry receives power from a backup power supply input 74, which is an integrated circuit pin or node that receives power from a backup power source (e.g. a battery or capacitor) separate from the main power supply used to supply the processor core 4 during regular operation. The persist buffer 60, write buffer 26 (and any other control logic associated with the write buffer and the persist buffer 60 which would be needed to allow those buffers to respond to the scans initiated by the training circuitry 70) may also be coupled to the backup power supply input 74. Note that during regular operation (when the draining trigger signal has not signalled any draining trigger event) the write buffer 26 and persist buffer 60 may be supplied with power from the main power supply, and the backup power supply may be used only if the main power supply is not available.

In summary, by implementing the draining scan region 40 so that any committed store requests requiring persistence in the write buffer 26 and any store data pending in the persist buffer 60 (which represents store data for committed store requests requiring persistence which have left the write buffer due to being written to the caches but which have not yet been written to PM 18) are guaranteed to be preserved even if there is a power down or a reset. The implementation using the persist buffer 60 avoids the need to scan the entire cache hierarchy 10, 12, 14 when the draining operation is performed, and so allows a lower capacity backup power source to be used to save cost. Any buffers within the PM memory controller 22 are still included in the draining scan region 40 (if implemented using volatile storage technology) to ensure that data currently being written back to PM 18 is still preserved even if it has not yet made it to the PM 18. If the buffers in the PM memory controller 22 are implemented using non-volatile storage then it is not necessary to include the buffers of the PM memory controller 22 in the draining scan region 40.

In summary, by extending the draining scan region 40 to include the write buffer 26, this avoids the ordering problems which would arise in the absence of barriers, and so enables those barriers to be eliminated simplifying software programming and improving application performance.

Figure 8:
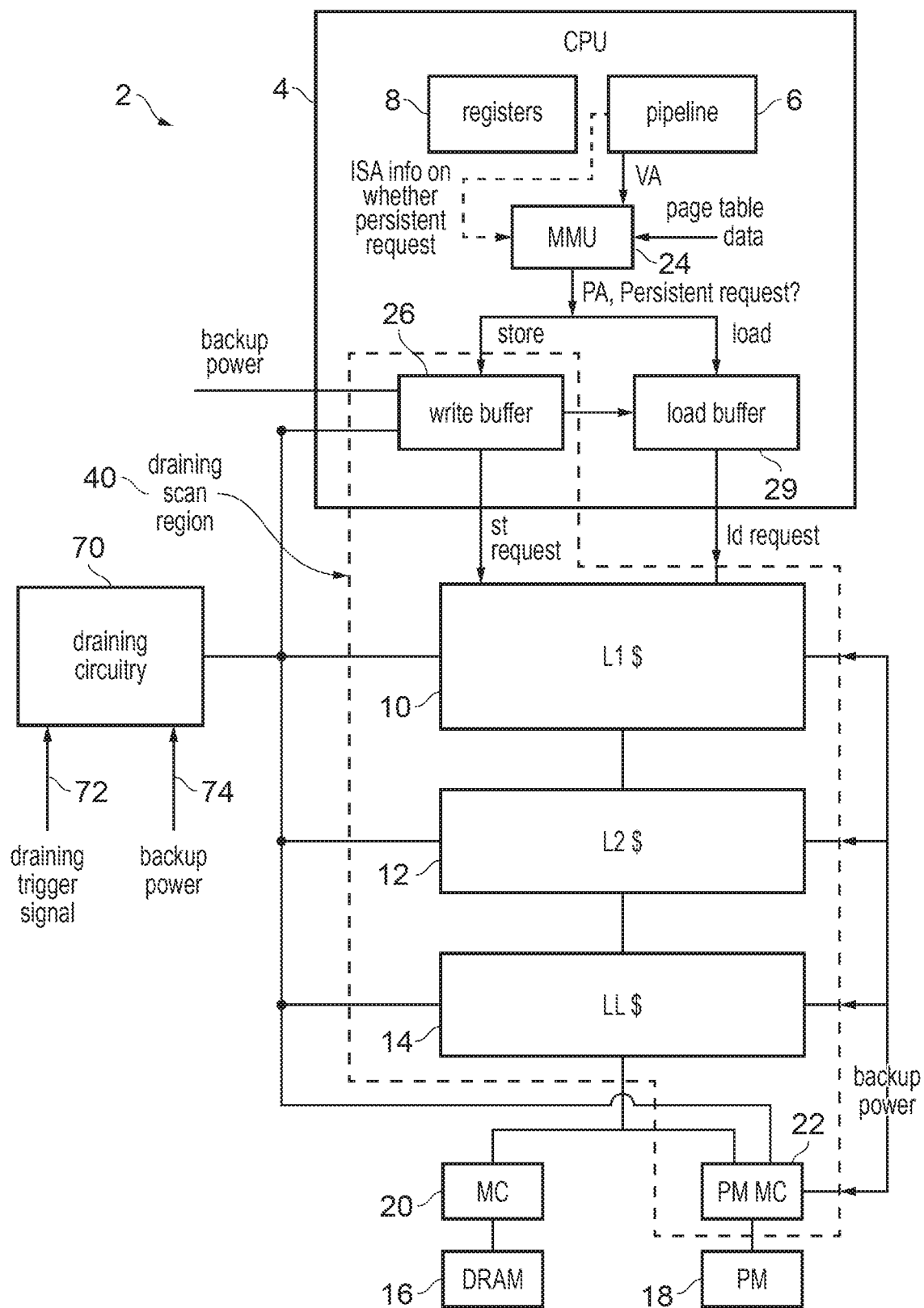
FIG. 8 shows an alternative example to FIG. 5 in which the persist buffer is not provided, and the draining scan region caches includes the write buffer, the caches, and a memory controller for controlling writes to persistent memory.

FIG. 8 shows an alternative implementation in which the persist buffer is not provided but otherwise the system 2 is similar to the one shown in FIG. 5. As the persist buffer 60 is not provided then to ensure that store data for any committed store requests which have left the write buffer 26 but have not had their store data written back to PM 18 yet can be preserved on a power failure or reset, the draining scan region 40 is defined to include the write buffer 26, the caches 10, 12, 14, and any buffers or queues within the PM memory controller 22. As the caches 10, 12, 14 are included in the draining scan region 40, this may require a larger capacity backup power source 74 as it will take a longer period of time to perform the draining operation, since the caches 10, 12, 14 are much larger structures than the write buffer 26, persist buffer 60 or buffers within the PM memory controller 22. Otherwise the operation of the example in FIG. 8 is similar to that of FIG. 5.

In both FIGS. 5 and 8, metadata is stored alongside the entries within the draining scan region 40 (in FIG. 5, the entries of the write buffer 26 and persist buffer 60, and in FIG. 8, the entries of the write buffer 26 and caches 10, 12, 14), to assist with draining. For example, the metadata may indicate the address of the data in the corresponding entry, to allow the draining circuitry 70 to identify which location in the PM 18 is to store the corresponding data. This metadata may be used by the draining circuitry 70 to control the draining operation, but is not itself drained to PM 18 during the draining operation.

Figure 9:
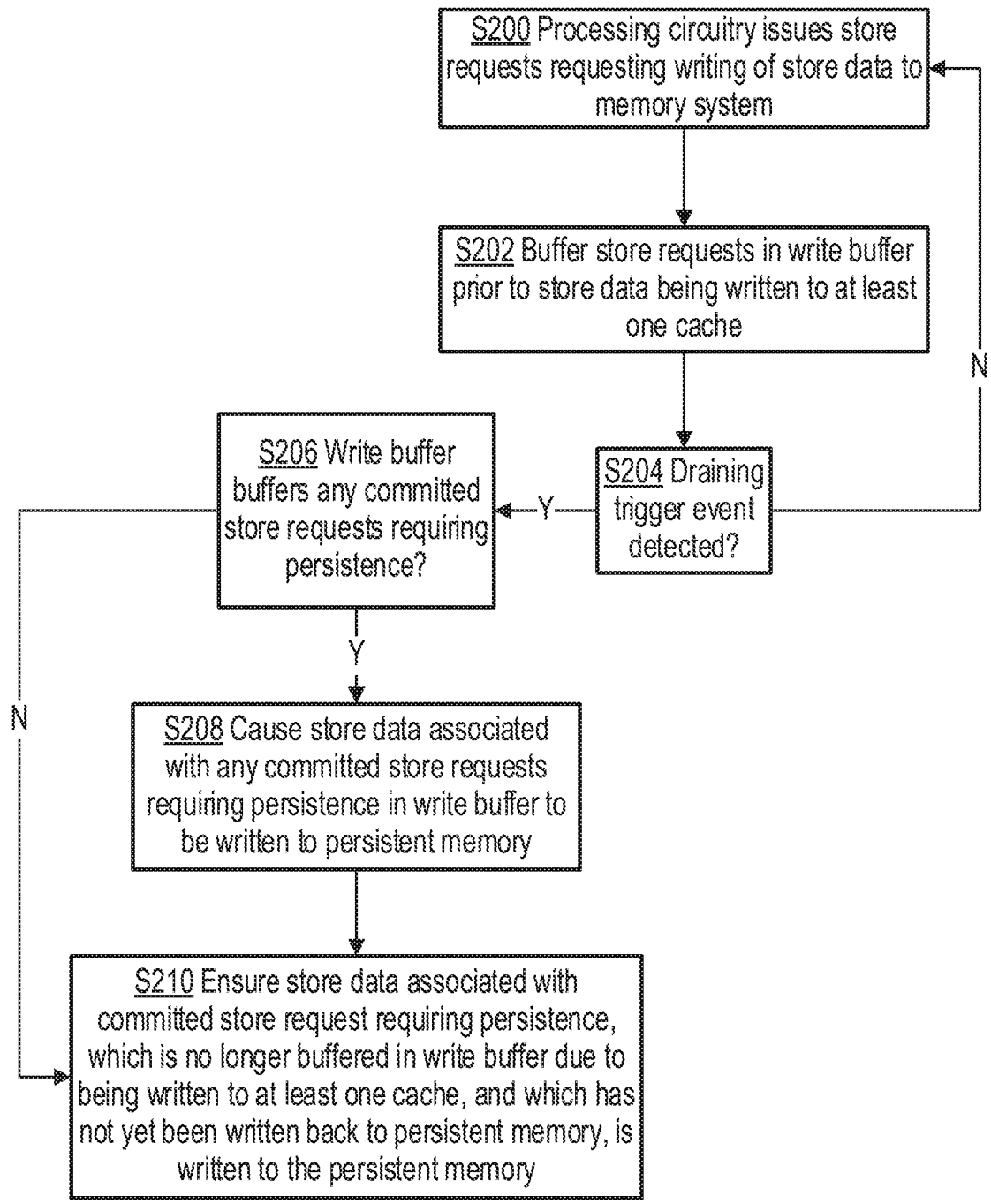
FIG. 9 is a flow diagram showing a method of performing a draining operation for persisting data to persistent memory in response to a draining trigger event.

FIG. 9 is a flow diagram summarising a method of controlling a draining operation using the draining circuitry 70 shown in FIGS. 5 and 8. At step S200 the processing circuitry 4 issues store requests requesting writing of store data to the memory system. The store requests are issued in response to store instructions executed by the pipeline 6. The MMU 24 performs address translation for the target address of the store request and at step S202 the issued store requests are buffered in the write buffer 26 prior to any store data being written to at least one cache. Draining of store requests from the write buffer 26 to the caches 10, 12, 14 and persist buffer 60 (if provided) may take place out of order with respect to program order. While in the write buffer it is possible that store requests could be merged together if they target overlapping addresses. Also some implementations may support stored data being forwarded from a pending store request in the write buffer to a corresponding load for an overlapping address.

At step S204 the draining circuitry 70 detects whether a draining trigger event (e.g. power down event or reset) is detected. If not, then the method returns to step S200 and store requests continue to be issued and buffered in the write buffer, and when possible, written through to the cache hierarchy (and from time to time written back from the caches 10, 12, 14 to main memory 16, 18 as the need arises due to limited capacity within the caches). The detection of the draining trigger event at step S204 may be based on an interrupt generated when the draining trigger event occurs. That is, it may not be necessary for the circuit logic to perform periodic checks for whether the draining trigger event is detected. Instead, it may be assumed that in the absence of the draining trigger interrupt, no draining trigger event is detected. When an interrupt of the type that represents the draining trigger event is detected, this may cause the draining circuitry 70 to perform steps S206-S210 to perform the draining operation.

When a draining trigger event does occur, then the draining circuitry 70 performs the draining operation to ensure that any store data associated with any committed store requests requiring persistence are written back to PM 18. At step S206 the draining circuitry 70 determines whether the write buffer 26 includes any committed store requests requiring persistence. As shown in the examples of FIGS. 6A, 6B and 7, this can be done by checking a designated region dedicated for handling persistent requests for any pending committed store requests, or by checking a persistent indicator 56 specified by write buffer entries to determine which requests require persistence. Any non-persistent store requests not requiring persistence, or store requests which have not yet been committed, do not need to have their store data written to PM. Hence, step S208 is skipped if the write buffer does not currently buffer any committed store requests requiring persistence. However if there is at least one committed store request in the write buffer requiring persistence then at step S208 the draining circuitry 70 causes the store data associated with any committed store requests requiring persistence in the write buffer 26 to be written to PM 18.

Regardless of whether the write buffer 26 contained any committed store requests requiring persistence or not, at S210 the draining circuitry also ensures that store data associated with any committed store requests requiring persistence which is no longer buffered in the write buffer due to being written to at least one cache, but which has not yet been written back to PM, is then written to the PM. This can be done in different ways. In the example of FIG. 5 step S210 comprises scanning the persist buffer 60 to identify any persistent stores logged in the persist buffer, so that it is not necessary to scan the caches themselves. In contrast, in the example of FIG. 8 then step S210 may include scanning the caches to identify entries in the caches which correspond to persistence store requests and which have not yet been written back to PM 18. Regardless of which approach is used, while FIG. 9 shows step S210 being performed sequentially after steps S206 and S208, step S210 could also be performed before steps S206 and S208, or in parallel with steps S206 and S208.

Hence, by performing the draining operation at steps S206 to S210 this ensures that the PM 18 is updated with the store data for any previously committed store requests, to ensure that the view of the outcome of the previous program or execution seem by PM is consistent with the stores up to a certain point in the program order. This is guaranteed because the write buffer 26 commits store request in program order even if execution by the pipeline 6 or write back to the level 1 cache 10 is out of order. Hence, the extension of the draining scan region to include the write buffer 26 helps to avoid the barriers described earlier. Hence the resulting code is much simpler and the software developer or compiler does not need to worry about ensuring PM consistency, as this is enforced by the draining circuitry 70 in hardware by providing the battery/capacitor-backed preservation guarantee for the write buffer 26 and the store data written to the caches.

Figure 10:
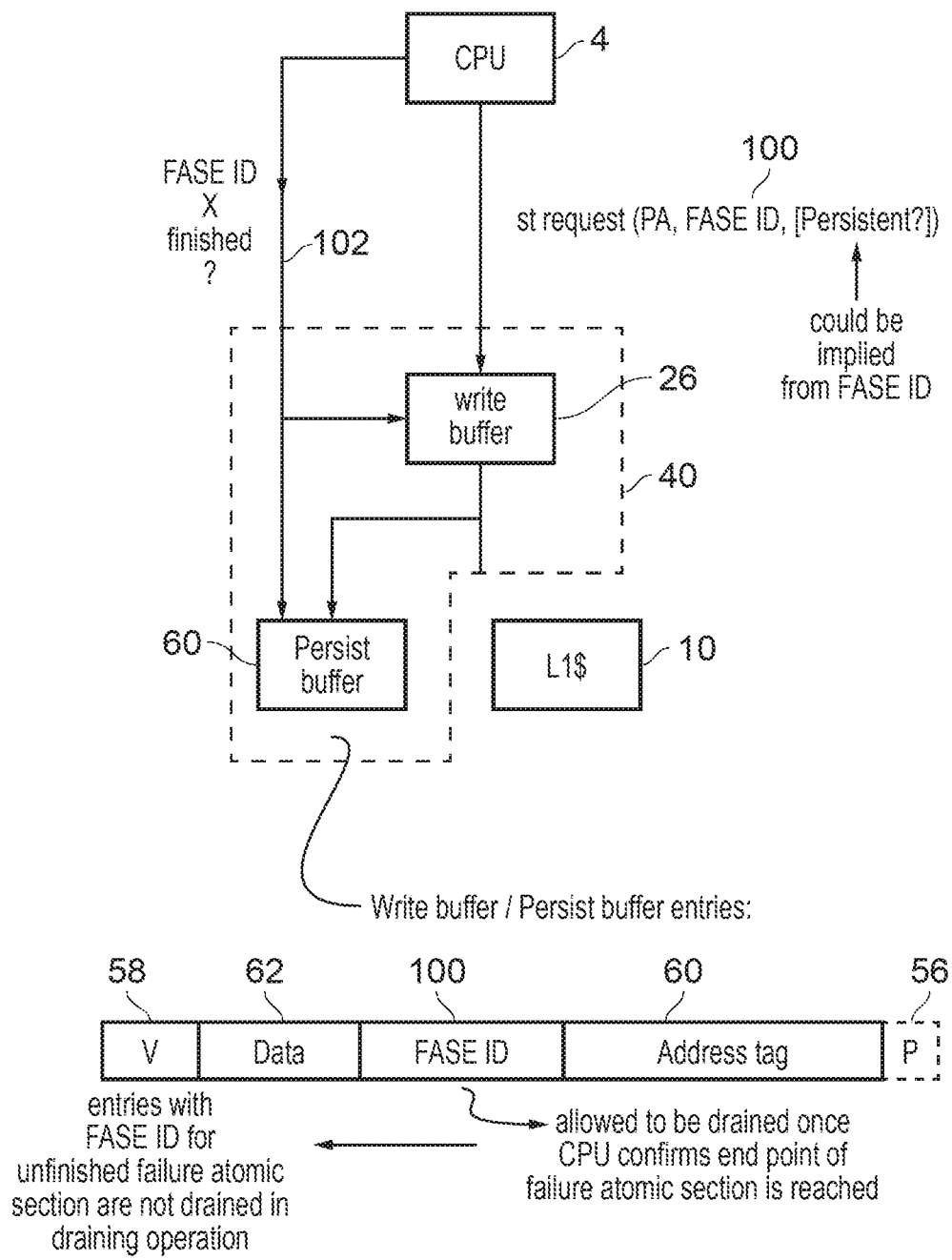
FIG. 10 shows an example in which store requests associated with a failure atomic section can be prevented from being drained in the draining operation if the draining trigger event occurs before the processing circuitry has confirmed that an end point of the failure atomic section has been reached.

FIG. 10 shows an additional feature which can be implemented in the write buffer 26 and the persist buffer 60 to enable software to control atomic sets of updates to PM 18. It may be desirable for some software to ensure that a certain number of store requests are either all guaranteed to be persisted to PM 18 in their entirety, or that none of those requests are guaranteed to be persisted, but it may be desirable to prevent it being possible that only some of the requests may be persisted. To achieve this, certain sections of code may be identified as a failure atomic section (FASE). For example program code could include a failure atomic section start instruction which marks the start of the failure atomic section and a failure atomic end instruction which marks an end point of the failure atomic section. Store requests associated with a failure atomic section can be tagged with a failure atomic section identifier (FASE ID) 100 and so the entries in the write buffer 26 and the persist buffer 60 may include, in addition to the valid bit 58, data 62, address tag 60 and any other information, a field for specifying the FASE ID 100. Although in some implementations the FASE ID may be a multi-bit identifier so that multiple distinct failure atomic sections can be pending at a time, in other simpler implementations the FASE ID 100 may simply be a single bit identifier, which identifies whether or not a given write buffer entry is associated with a failure atomic section. This may be sufficient support for failure atomic sections for many software implementations. In some cases the separate persistence indicator 56 may not be required if the FASE ID 100 is provided since in some cases certain default values of the FASE ID could be used to flag non PM requests and it may be assumed that any store requests within a failure atomic section is persistent. Other implementations may provide a separate persistent indicator to allow certain requests not within a failure atomic section to still be indicated as persistent. In some cases, entries of the level one cache 10 could also be tagged with the FASE ID 100.

With this approach, entries of the write buffer having a particular value of the FASE ID field 100 (e.g. FASE ID=0) may be assumed to be entries not associated with any uncompleted failure atomic section. Entries of the write buffer having the FASE ID field 100 set to any other value may be assumed to be associated with a still-to-be-completed failure atomic section (if the FASE ID field 100 includes more than one bit, then the FASE ID value identifies the particular failure atomic section associated with that entry).

When the processing circuitry (which could be a CPU or other non-CPU processing elements such as a GPU) 4 reaches the end point for a given failure atomic section, the processing circuitry 4 issues a signal 102 to the write buffer 26 and persist buffer 60 and/or cache 10 specifying the FASE ID of the completed failure atomic section. In response to this signal 102, the write buffer 26, persist buffer 60 and/or cache 10 updates any entries whose FASE ID field 100 matches the specified FASE ID in the signal 102 to update their entries to indicate that those entries can now be drained if a draining operation is performed in response to the draining trigger signal 72. In implementations which use a single-bit FASE ID, the signal 102 may not need to specify any specific FASE ID of the completed failure atomic section, but can simply be assumed by default to indicate that any entries with the FASE ID field 100 set to indicate store requests associated with an uncompleted failure atomic section can now have the FASE ID field 100 cleared to indicate that these store requests are no longer associated with an uncompleted failure atomic section (hence in this implementation, there may be no need for a comparator for comparing FASE IDs of entries with a FASE ID specified as completed).

When the draining circuitry 70 performs the draining scan of the write buffer 26 or persist buffer 60 to identify data to save to PM, the draining circuitry 70 may prevent any store data being saved to PM from a write buffer/persist buffer entry where the FASE ID 100 specifies that the corresponding store request relates to a still-to-be-completed failure atomic section (even if the corresponding store request is a persistent store request).

Hence, with this approach it can be guaranteed that any store requests requiring persistence which are executed within a particular failure atomic section will persisted to PM only if that entire failure atomic section has completed and so it is not possible for partial results of the failure atomic section to become visible to PM. Note that for stores to the level one cache 10 associated with a particular failure atomic section, write back of data from the level one cache to the level two cache 12 may also be deferred until after the processing circuitry 4 has confirmed the end point of the failure atomic section has been reached, to prevent normal write backs to the PM 18 for that data being allowed if the failure atomic section is still pending. Also, in implementations where the cache 10 of a given processing circuit 4 can store data associated with an uncompleted failure atomic section, visibility of that data to other processing circuits (e.g. other CPUs or GPUs) may also be deferred until the end point of the failure atomic section has been reached. For example, the cache 10 may not respond to snoop requests for an address associated with an uncompleted failure atomic section until the failure atomic section is completed.

These features shown in FIG. 10 are not essential, but if provided as a micro architectural enhancement, mean that store data can be held back within the write buffer 26 or persist buffer 60 or level 1 cache 10 until all the writes in a failure atomic region become available. This can enable hardware to provide techniques for multi-versioning for failure atomicity, which can help to reduce the software overhead, as if these features were not provided in hardware then the software may instead need to include instructions to implement undo/redo logging or copy-on-write.

In the example of FIG. 10, writes are allowed to pass from the write buffer 26 to the persist buffer 60 and level 1 cache 10 while the failure atomic section is still uncompleted (as the persist buffer 60 and/or cache 10 includes tracking of FASE ID 100 and so can prevent subsequent writebacks to PM being performed before the failure atomic section reaches its end point).

Another option would be that writebacks of store data from the write buffer 26 to the level 1 cache 10 and persist buffer 60 may be deferred if the store data relates to a store request in a still-to-be-completed failure atomic section. This may simplify the implementation of the persist buffer 60 and level 1 cache 10 as there is no need to provide circuit logic for storing the FASE ID 100 and managing the operations associated with updating the FASE ID 100 when the processor core 4 issues the signal 102 signalling completion of a failure atomic section, or to provide any special operations to ensure no data associated with an uncompleted failure atomic section is written back to PM 18 (either during regular writebacks from the cache to memory, or during the draining operation) or is made visible to other processing elements 4. However, if all store requests associated with a failure atomic section are held back in the write buffer 26 until the failure atomic section completes, then the maximum size of a failure atomic section may be limited based on the capacity of the write buffer 26.

Some code examples are shown below to illustrate further reduction in software development overhead and increase in performance that can be achieved by including support for failure atomicity as shown in FIG. 10. In these examples it is assumed that there is a desire to implement failure atomicity so that a first store A and a second store B are to be persisted in an atomic manner so that it is not possible for the persistent memory to retain the store data for only one of these stores A and B after a power down or reset while the store data for the other store is not retained. For example, this could be useful for a banking application where a transfer needs to be made from account A to account B and so store A deducts the transferred amount from the balance for account A and store B adds the transferred amount to the balance for account B. Note that these examples show the assembly code compiled from high-level language. Example 1 shows a code example for a hardware implementation which does not support the draining circuitry 70 mentioned earlier and also does not support failure atomicity using the FASE ID 100 as discussed above.

Example 1

```
1    FASE
2    {
3        STORE log-A;
4        DCCVAP log-A;
5        DSB;
6        STORE A;
7        DCCVAP A;
8        DSB;
9        STORE log-B;
10       DCCVAP log-B;
11       DSB;
12       STORE B;
13       DCCVAP B;
14       DSB;
15   }
```

Here, the instructions at lines 3 and 9 are store instructions for recording an "undo log" in persistent storage, to capture the previous values of the memory locations targeted by the stores A and B at lines 6 and 12, so that these previous values can be reinstated if a power down or reset occurs when only part of the stores A and B within the failure atomic section FASE have been persisted to persistent memory. This ensures the failure atomicity of the failure atomic section. As the hardware implementation does not support any draining circuitry, it is necessary for the software to include the cache flush instructions (DCCVAP) and barrier instructions (DSB) for the reasons mentioned earlier, not only at lines 7, 8, 13 and 14 in relation to the stores at lines 6, 12, but also at lines 4, 5, 10 and 11 in relation to the undo log store instructions at lines 3, 9.

Example 2 below shows a second code example for a system which implements draining circuitry according to the approach shown in FIG. 3 discussed above, where the draining scan region 40 includes the caches but does not include the write buffer 26. This allows the cache flush instructions DCCVAP for both the undo logging stores and the regular stores to be eliminated, but the undo logging stores themselves are still needed to provide the failure atomicity and the barriers (DMB) are still required for enforcing ordering and writebacks from the write buffer 26 for the reasons discussed above.

Example 2

```
1    FASE
2    {
3        STORE log-A;
4        DMB;
5        STORE A;
6        DMB;
7        STORE log-B;
8        DMB;
9        STORE B;
10       DMB;
11   }
```

Example 3 below shows a third code example for a system where the hardware implements both the draining circuitry 70 (with the write buffers 26 within the draining scan region 40 as mentioned earlier) and the support for failure atomic sections using the FASE ID 100 which provides multi-versioning in hardware as shown in FIG. 10. The inclusion of the write buffers 26 within the draining scan region 40 eliminates the need for the barrier instructions for the reasons given earlier, and the support for hardware multi-versioning allows the undo logging store instructions to be eliminated.

Example 3

```
1    FASE
2    {
3        STORE A;
4        STORE B;
5    }
```

Therefore, the overhead from the software point of view is greatly reduced, as the code now contains only the store instructions themselves, and the additional instructions previously needed to deal with the ordering and atomicity issues associated with supporting PM have been eliminated. As fewer instructions need to be executed and the barriers have been removed, performance can be improved.

Hence, with failure atomicity, cache line flushes and store ordering all being taken care of in the proposed approach above, sequential programs such as the linked list or banking examples described earlier can run on PM without cache flush instructions and barriers, just like they do with systems which only use volatile DRAM without the need to reason about crash consistency. This removes performance overheads and development effort, greatly simplifying persistent programming.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
    processing circuitry to issue store requests requesting writing of store data to a memory system comprising at least one cache and persistent memory;
    a write buffer to buffer the store requests issued by the processing circuitry, prior to the store data being written to the at least one cache; and
    draining circuitry to detect a draining trigger event having potential to cause loss of state stored in the at least one cache, and in response to detection of the draining trigger event, to perform a draining operation to identify whether the write buffer buffers any committed store requests requiring persistence, and when the write buffer buffers at least one committed store request requiring persistence, to cause the store data associated with the at least one committed store request requiring persistence to be written to the persistent memory, wherein:

the processing circuitry is configured to commit store requests buffered to the write buffer in program order; and writeback of store data from the write buffer to the at least one cache for a plurality of store requests is permitted to be performed in a different order from a program order associated with the plurality of store requests.

2. The apparatus according to claim 1, in which in the draining operation, when the write buffer buffers at least one committed non-persistent store request which does not require persistence, the draining circuitry is configured to prevent the store data associated with the at least one committed non-persistent store request from being written to the persistent memory.

3. The apparatus according to claim 2, in which the write buffer comprises a first storage region to buffer persistent store requests requiring persistence, and a second storage region to buffer non-persistent store requests not requiring persistence; and in the draining operation, the draining circuitry is configured to scan the persistent region of the write buffer to identify whether the first storage region buffers at least one committed store request, and to omit scanning of the second storage region.

4. The apparatus according to claim 2, in which each entry of the write buffer comprises a persistence indicator specifying whether a corresponding store request is a persistent store request requiring persistence or a non-persistent store request; and in the draining operation, the draining circuitry is configured to scan the write buffer to identify at least one entry which represents a committed store request for which the persistence indicator specifies that the corresponding store request is a persistent store request, and to cause the store data associated with the at least one entry to be written to the persistent memory.

5. The apparatus according to claim 2, in which the processing circuitry is configured to determine whether the given store request is a persistent store request requiring persistence or a non-persistent store request not requiring persistence based on at least one of:

page table data associated with a target address of the given store request;

capability information associated with the target address of the given store request; and/or an encoding of an instruction which caused the given store request to be issued by the processing circuitry.

6. The apparatus according to claim 1, in which in response to the draining trigger event, the draining circuitry is configured to ensure that store data associated with a committed store request requiring persistence, which is no longer buffered in the write buffer due to being written to the at least one cache, and which has not yet been written back to the persistent memory, is written to the persistent memory in the draining operation.

7. The apparatus according to claim 1, in which, in response to the draining trigger event, the draining circuitry is configured to scan at least a portion of the at least one cache to identify store data to be written to the persistent memory in the draining operation.

8. The apparatus according to claim 1, in which the draining trigger event comprises at least one of:

a reset event; and a power down event.

9. The apparatus according to claim 1, in which the draining circuitry and at least a portion of the write buffer are coupled to a backup power supply input for supplying backup power during the draining operation, where the backup power supply input is separate from a main power supply input for supplying power to the processing circuitry.

10. The apparatus according to claim 1, comprising write buffer control circuitry to support at least one of:

merging of two or more store requests buffered in the write buffer targeting overlapping addresses; and store-to-load forwarding of store data from a given store request to a given load request, where the given store request and the given load request target overlapping addresses.

11. The apparatus according to claim 1 in which the persistent memory is byte-addressable.

12. The apparatus according to claim 1, in which the persistent memory comprises one or both of:

at least one off-chip persistent memory module; and at least one on-chip persistent memory module.

13. An apparatus comprising:

processing circuitry to issue store requests requesting writing of store data to a memory system comprising at least one cache and persistent memory;

a write buffer to buffer the store requests issued by the processing circuitry, prior to the store data being written to the at least one cache;

draining circuitry to detect a draining trigger event having potential to cause loss of state stored in the at least one cache, and in response to detection of the draining trigger event, to perform a draining operation to identify whether the write buffer buffers any committed store requests requiring persistence, and when the write buffer buffers at least one committed store request requiring persistence, to cause the store data associated with the at least one committed store request requiring persistence to be written to the persistent memory;

a persist buffer; and persist buffer write control circuitry to control, when store data is written back from the write buffer to the at least one cache for a store request requiring persistence, writing of the store data to the persist buffer as well as to the at least one cache, wherein in response to detection of the draining trigger event, when the persist buffer stores store data not yet written back to the persistent memory, the draining circuitry is configured to cause the store data stored in the persist buffer to be written to the persistent memory.

14. The apparatus according to claim 13, in which the at least one cache is excluded from a storage region scanned by the draining circuitry in the draining operation to identify store data to be written to the persistent memory in response to the draining trigger event.

15. An apparatus comprising:

processing circuitry to issue store requests requesting writing of store data to a memory system comprising at least one cache and persistent memory;

a write buffer to buffer the store requests issued by the processing circuitry, prior to the store data being written to the at least one cache; and draining circuitry to detect a draining trigger event having potential to cause loss of state stored in the at least one cache, and in response to detection of the draining trigger event, to perform a draining operation to identify whether the write buffer buffers any committed store requests requiring persistence, and when the write buffer buffers at least one committed store request requiring persistence, to cause the store data associated with the at least one committed store request requiring persistence to be written to the persistent memory, wherein in response to the draining trigger event, the draining circuitry is configured to prevent store data associated with a given store request requiring persistence from being written to the persistent memory when the draining circuitry determines that the given store request was issued in response to an instruction executed within a failure atomic section of program execution and that an end point of the failure atomic section has not yet been reached by the processing circuitry.

16. The apparatus according to claim 15, in which at least a portion of the write buffer comprises write buffer entries specifying a failure atomic section identifier for identifying an associated failure atomic section, and in response to an indication from the processing circuitry that a given failure atomic section associated with a given failure atomic section identifier has been committed, the write buffer is configured to update write buffer entries in said at least a portion of the write buffer for which the failure atomic section identifier corresponds to the given failure atomic section identifier, to indicate that store data associated with the updated write buffer entries is allowed to be written to persistent memory in the draining operation.

* * * * *